Patented Apr. 27, 1943

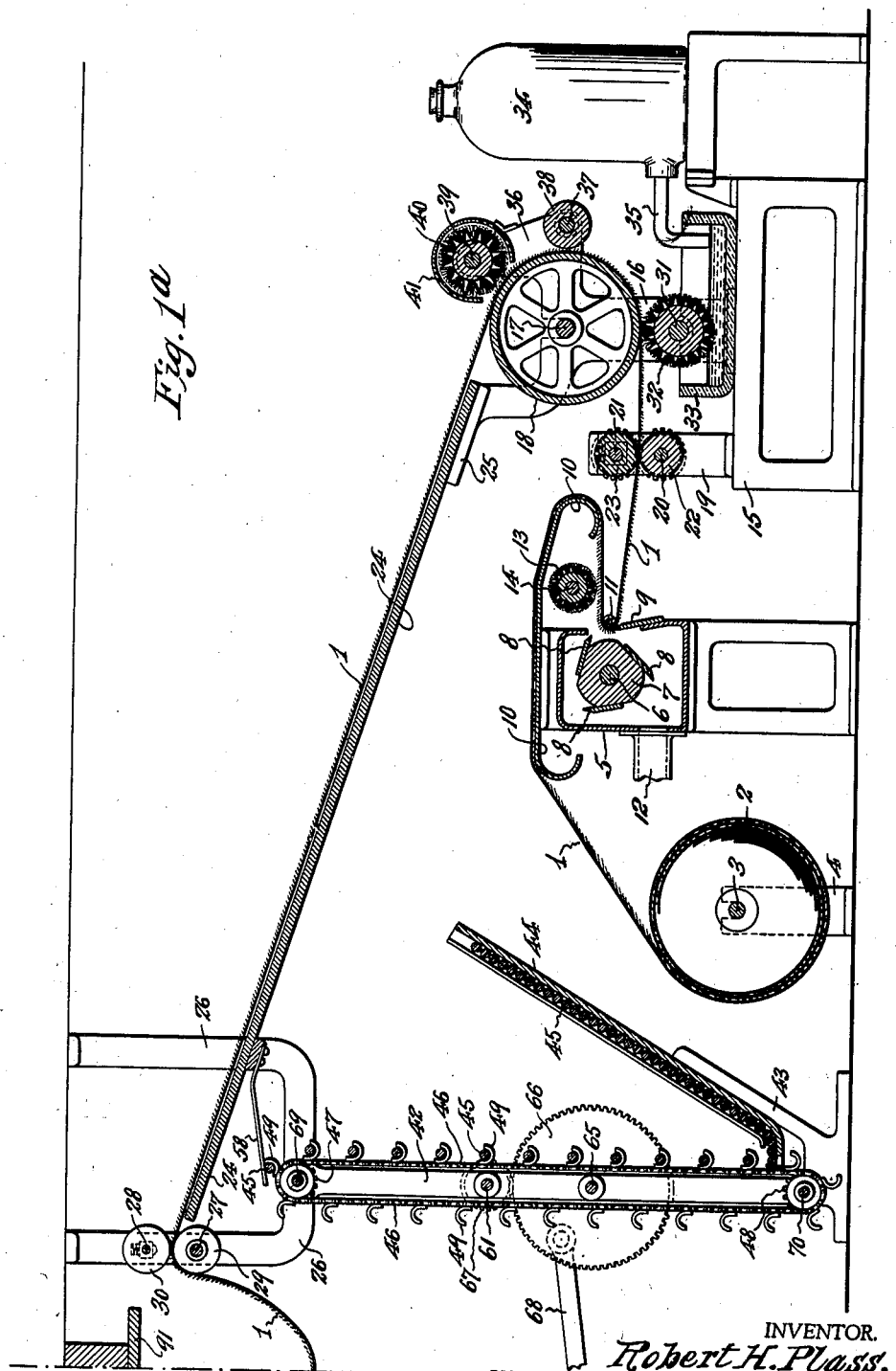

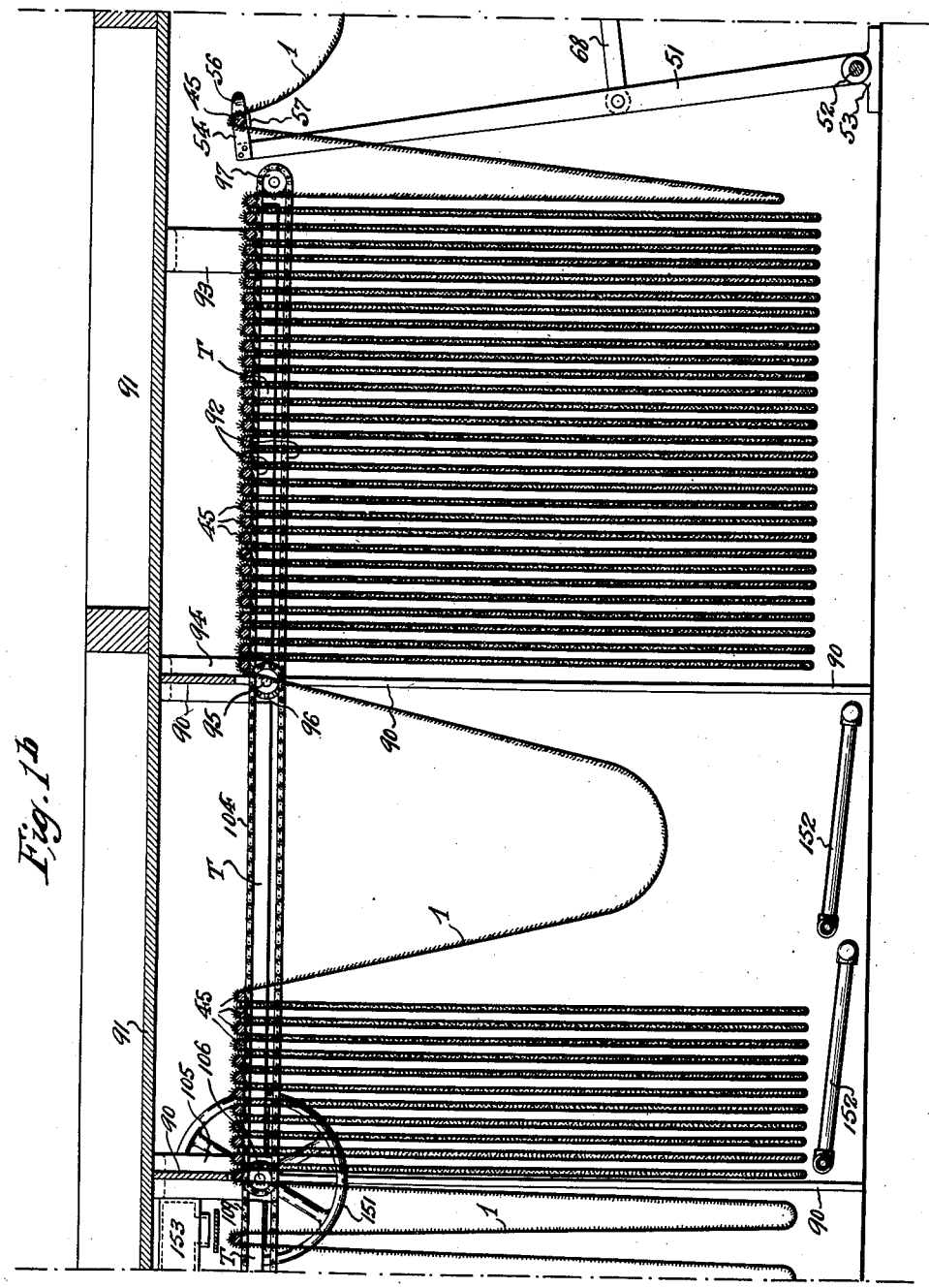

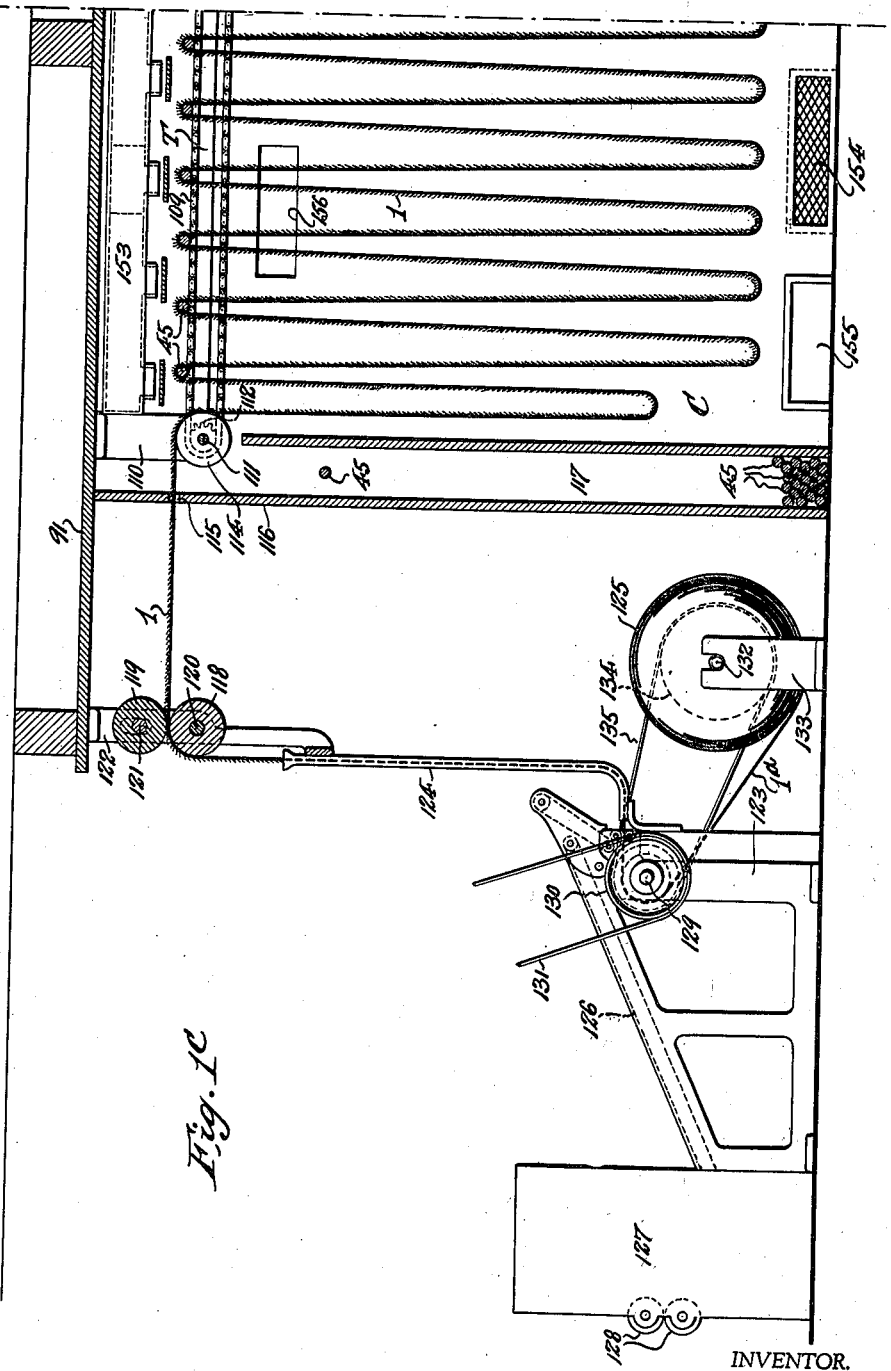

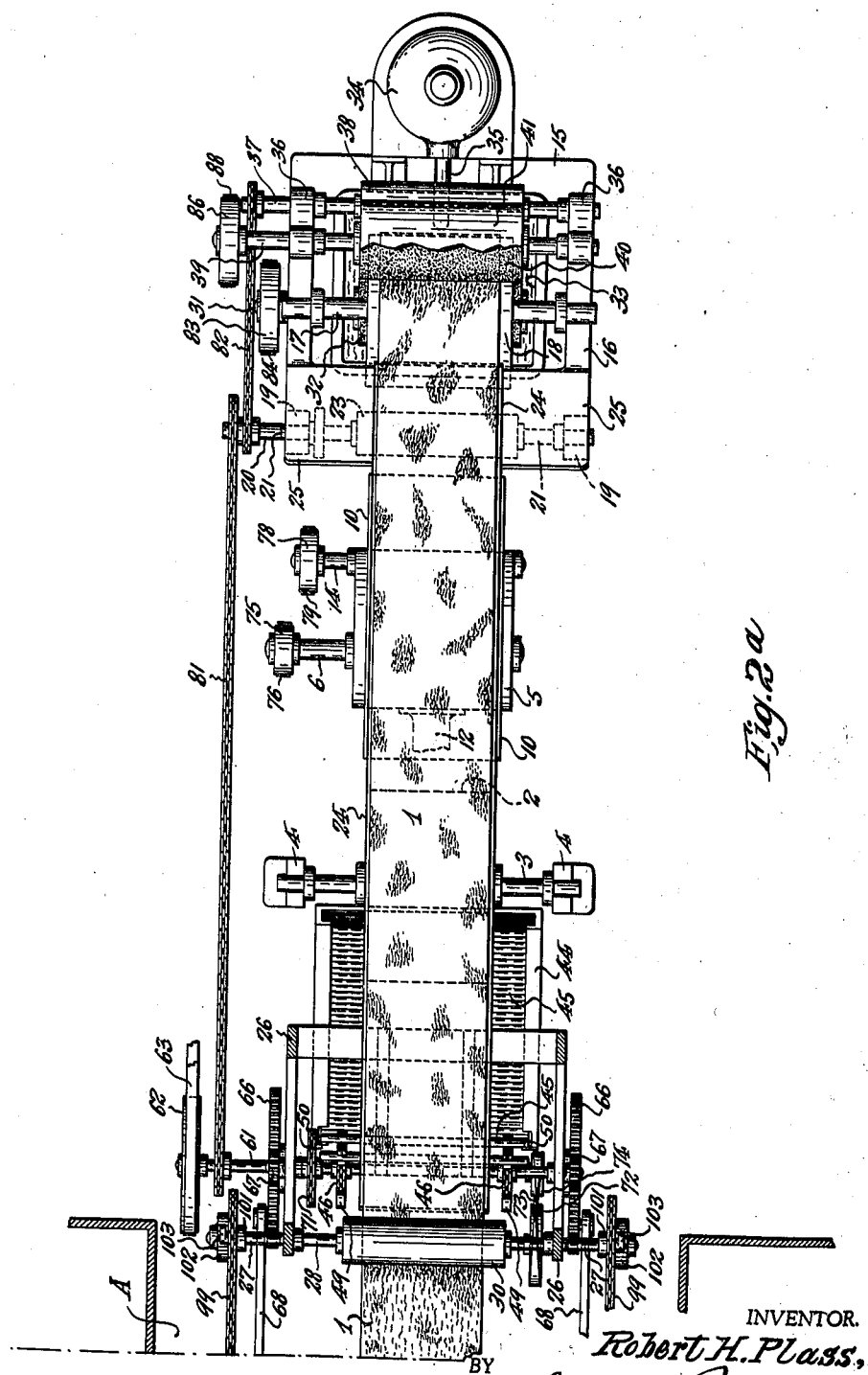

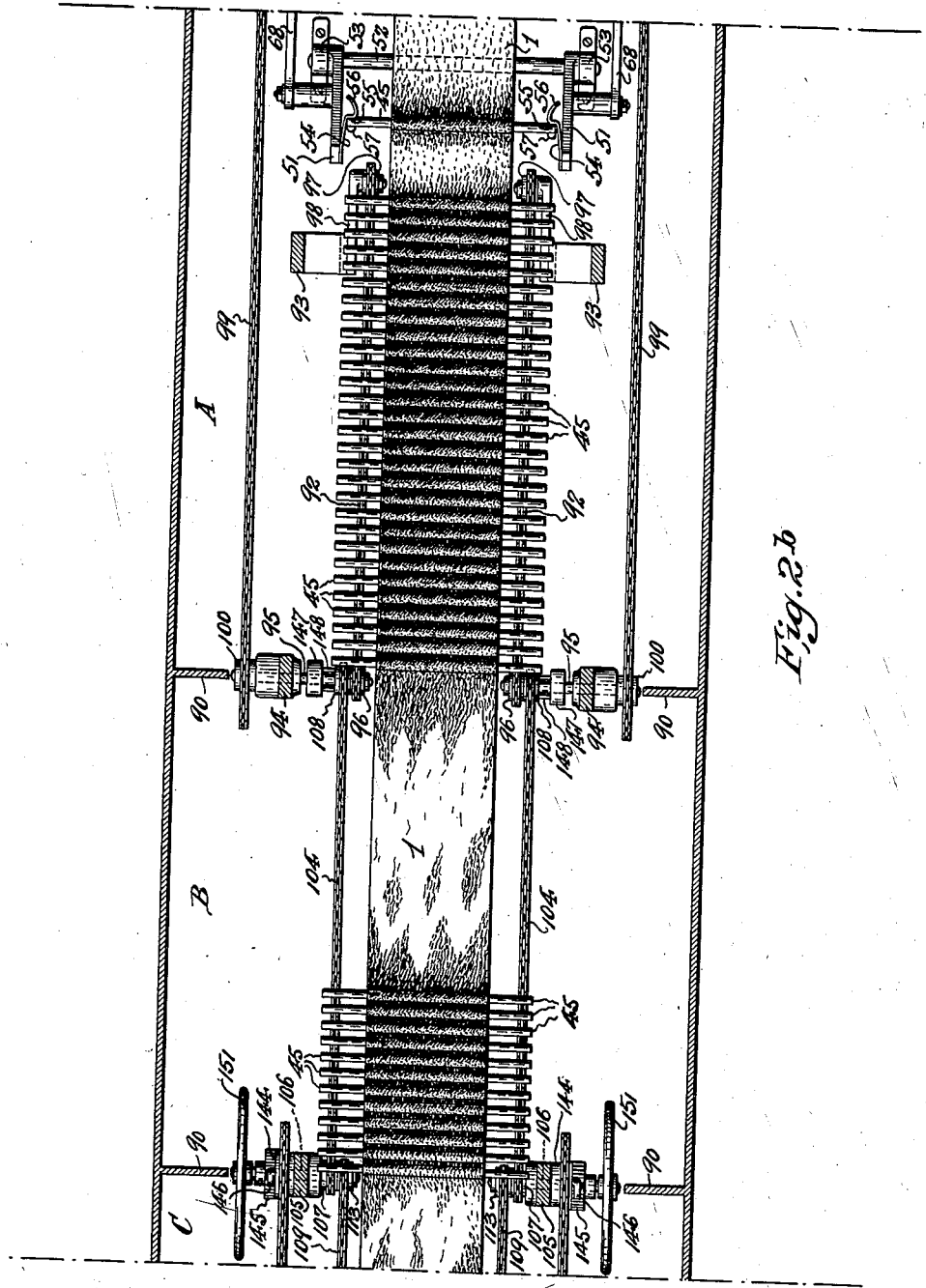

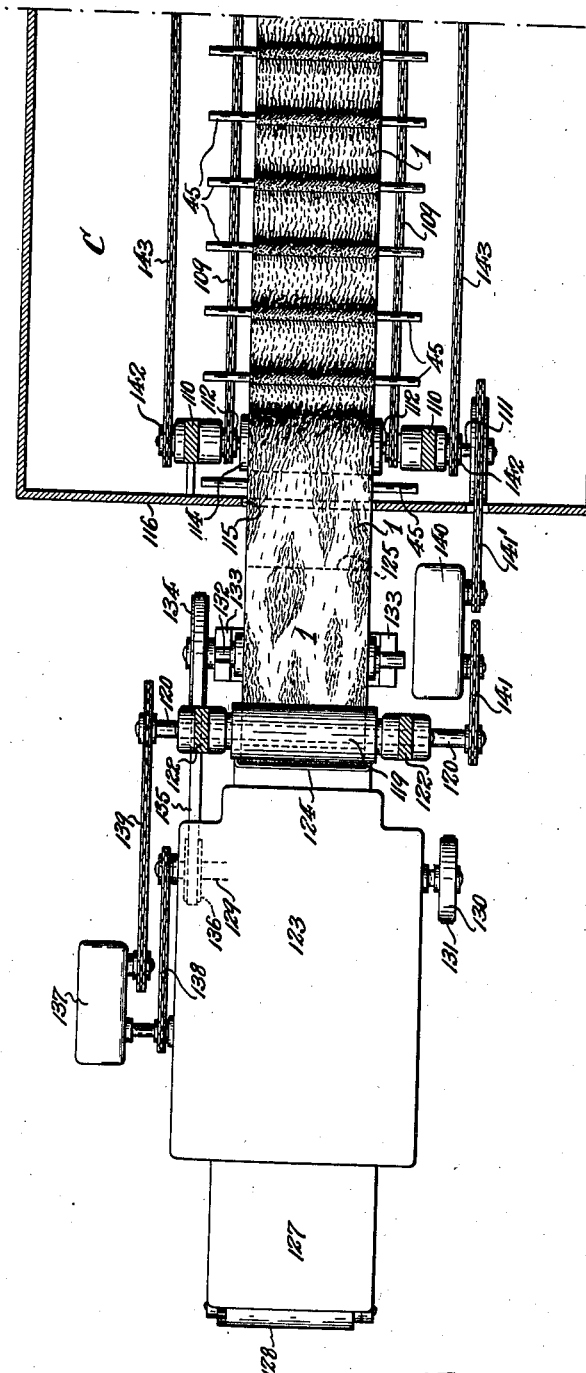

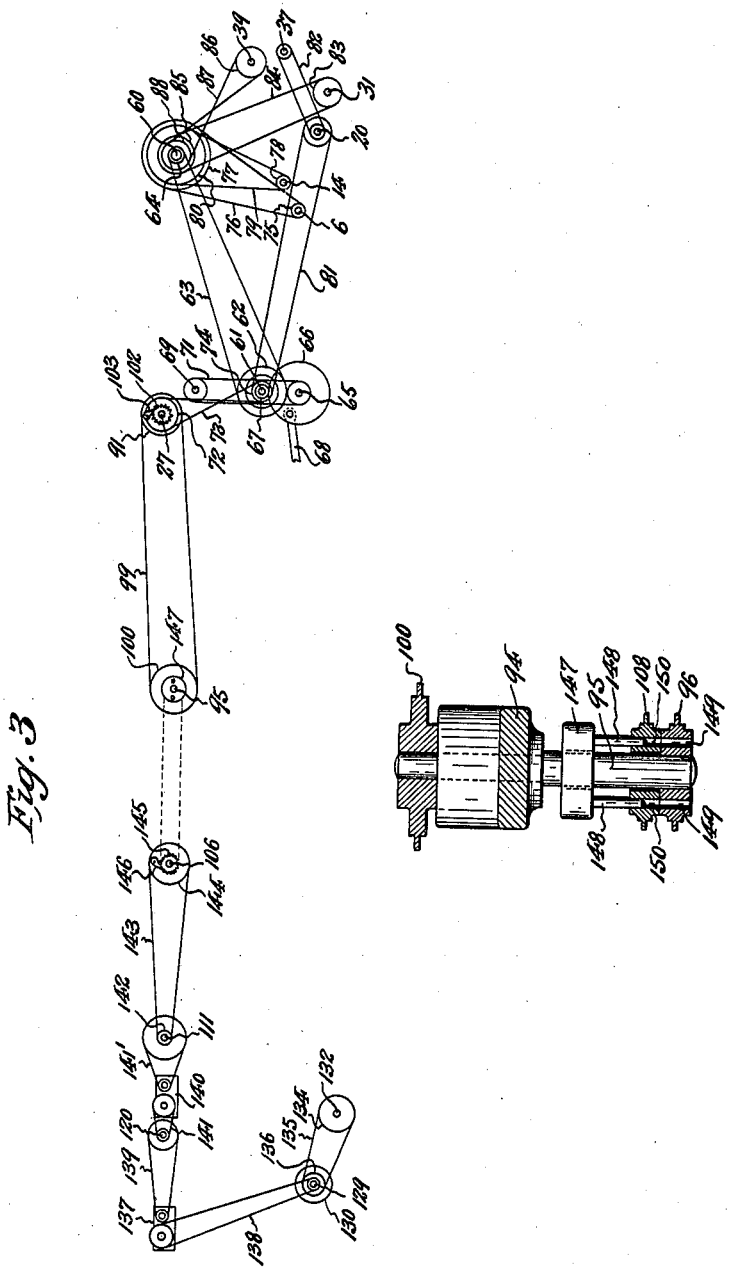

2,317,937

UNITED STATES PATENT OFFICE 2,317,937

APPARATUS FOR HANDLING HAT FUR CARRIER MATERIAL OR THE LIKE

Robert H. Plass, Upper Montclair, N. J.

Application January 19, 1940, Serial No. 314,603

8 Claims. (Cl. 271—2.2)

This invention relates to a novel means for handling flexible hat fur carrier material or the like.

This invention has for an object to provide a novel apparatus for handling hat fur carrier material whereby the operations of shearing, carroting, drying, cutting and blowing, or a desired selected group of such operations, may be successively carried out in a continuous sequence without necessity for hand manipulation of the pelts or fur pieces from which the fur is to be obtained.

This invention has for a further object to provide a novel apparatus whereby fur pieces (comprising whole pelts, fur scrap or both), which have been assembled and pasted upon the face of a continuous carrier or backing sheet, in the manner disclosed in my U. S. Patent No. 2,175,309 of Oct. 10, 1939, may be automatically manipulated for subjection to operations required in the production of hat fur therefrom by passing the carrier or backing sheet by which the same are supported successively through correlated apparatus for effecting such operations.

The invention has for a more general object to provide novel means for progressively looping an indeterminate running length of flexible material upon successively applied supporting rack rods, and then accumulating the rod supported loops upon conveyer means for delivering the material through drying or other desired treating means.

Other objects of this invention, not at this time more particularly enumerated, will be understood from the following detailed description of the same.

An illustrative embodiment of this invention is shown in the accompanying drawings, in which:

Figs. 1ª, 1ᵇ and 1ᶜ, taken together, show a longitudinal vertical section through the novel apparatus according to this invention.

Figs. 2ª, 2ᵇ, and 2ᶜ, taken together, show a top plan view of the novel apparatus, with parts in horizontal section.

Fig. 3 is a diagrammatic view of the power transmission by which the apparatus is served, this view being drawn on a reduced scale; and Fig. 4 is a fragmentary view in part section of clutch mechanism operative between certain of the material conveyers of the apparatus.

Similar characters of reference are employed in the above described views, to indicate corresponding parts.

A carrier or backing sheet, usually of paper, upon which has been assembled and pasted the pelts or fur pieces from which the desired hat fur is to be obtained, and which is herein designated the material web I, is rolled upon itself to provide a supply roll 2 from which the material web is drawn for movement through the fur producing apparatus of this invention. Said supply roll 2 is mounted on a shaft 3, which in turn is rotatably supported by and between bearing pedestals 4.

Rearwardly of the supply roll 2 is located a shearing mechanism including, a housing 5 in connection with which is journaled the shaft 6 of a rotatable knife cylinder 7 located within the housing. The blades 8 of said cylinder cooperate with a stationary bed knife 9. Supported above said housing 5 is a suitably shaped material web guide means 10, over which the material web I passes from the supply roll 2. From the discharge end of said guide means 10, the material web I extends to and around the supporting roller II of said shearing mechanism. In passing around the roller II, the material web I is so controlled, that the pelts or fur pieces carried thereby are disposed relative to the bed knife 9 in such manner as to lay the long and excess hair of said pelts or fur pieces across the bed knife 9, and subject to the shearing action of the revolving knife cylinder blades 8, whereby said long and excess hair is sheared and trimmed away, and then discharged from the housing 5 by suction effective in the discharge conduit 12 leading out of said housing. Said shearing mechanism is provided with a cylindrical brush member 13 mounted on an actuating shaft 14 so as to be located above the course of the material web I passing from the discharge end of the guide means 10 to the supporting roller II. This brush member 13 operates to loosen up the fur, carried by the material web I, thereby to facilitate operative engagement thereof by the bed knife 9 and cooperating knife cylinder blades 8.

Rearwardly of the shearing mechanism is located a carroting means, the same comprising a suitable framework 15 including bearing standards 16. Journaled in said bearing standards 16 is the shaft 17 of a rotatable material web supporting drum 18, beneath and around which the material web I passes after leaving the shearing mechanism. Mounted in bearing standards 19 which are connected with the framework 15 are the shafts 20 and 21 of a pair of preferably intergeared, cooperating web material feed rollers 22 and 23, the same being located intermediate the drum 18 and the discharge side of said shearing mechanism. These feed rollers 22 and 23 are power driven and serve to draw the material web 1 off of the supply roll 2 and thence through the shearing mechanism, thereupon delivering the same to and for passage over said drum 18.

Leading forwardly from upper side of said drum 18 is an upwardly inclined web material supporting and guide way 24, the rearward end of which is supported by bracket means 25 connected with the standards 16 of the carroting means framework, and the forward end of which is supported in connection with frame members 26 located beyond the position of the supply roll 2. Journaled in connection with said frame members 26 are the shafts 27 and 28 of another pair of feed rollers 29 and 30 which are located adjacent to the discharge end of said guideway 24. The material web 1, as it leaves the drum 18, moves upwardly and onwardly along the guideway 24 and between said feed rollers 29 and 30; the latter being power driven so as to move the material web 1 over said drum 18 and guideway 24, and thereupon deliver the same for engagement by carrier rods upon which the same is to be draped in suspended looped folds for continued advance subject to further operations to be presently described.

Journaled in the bearing standards 16 is the shaft 31 of a rotated carroting acid applicator brush roll 32 which is located beneath the drum 18, and so as to operatively engage the fur side of the material web 1 as moved over and around said drum. Supported by the framework 15 beneath said acid applicator brush roll 32 is an upwardly open carroting acid tray or reservoir 33, into the acid content of which the rotated applicator brush roll 32 dips. Said acid applicator brush roll 32 is driven at a peripheral speed greater than the linear speed at which the material web 1 is caused to travel, thereby assuring that the carroting acid applied by the former to the latter is well and thoroughly brushed into the fur desired to be carroted thereby. The carroting acid is maintained at a constant predetermined level in the tray or reservoir 33 by means of a Mariotte bottle 34 from which the acid is supplied to said tray or reservoir; the discharge outlet 35 of said bottle 34 has its outlet spaced above the tray or reservoir bottom in the plane of the level of acid desired to be maintained.

Journaled in extensions 36 of the bearing standards 16 is the shaft 37 of a presser roll 38. This roll is preferably made of rubber, and so positioned as to run tangent to the drum 18 and so as to engage the material web 1 after application of the carroting acid thereto. Said presser roll 38 operates to force or press the applied carroting acid deeply into the fur so as to assure thorough and uniform application thereof to the fur filaments. While use of this presser roll is desirable, especially in connection with heavy, thick furs, it may be omitted as not essential in the treating of light or thin furs.

Also journaled in the extension 36 of the bearing standards 16, above the location of the presser roll 38, is the shaft 39 of a rotatable slicking brush 40 which is also located to run tangent to the drum 18 so as to engage the material web 1 moving thereover. This slicking brush 40 is driven in a direction opposite to that of the forward movement of the material web 1, and its purpose is to slick down the wet fur while at the same time brushing out therefrom excess carroting acid. Preferably, an enclosing hood 41 is provided in association with this slicking brush 40 so as to prevent scattering discharge of acid spray therefrom during operation.

In practice the carroting brush 32, presser roll 38 and slicking brush 40 are preferably so mounted as to be adjustable toward and from the drum 18 for cooperation with thick or thin fur, as the case may be.

The frame members 26, which extend between the ceiling and floor of the room in which the mechanism is installed, include standards 42 in connection with the lower or floor supported ends of which are suitably formed supporting brackets 43. Supported by said brackets 43 is a magazine 44 to contain a supply of racking rods 45 to which the material web 1 is to be applied so as to be draped in suspended looped folds subject to further advance through assembling and drying chambers of the apparatus.

Supported by and between the standards 42 of the frame members 26 is a rod feeding elevator mechanism. This elevator mechanism comprises a pair of transversely spaced vertically extending endless elevator belts, preferably in the form of chains 46 which run over upper and lower sprockets 47 and 48. Affixed to and along said chains 46, at suitably spaced intervals, are rod carrier hooks 49.

The magazine 44, as supported by the brackets 43, is disposed to incline forwardly and downwardly toward the lower end of the elevator mechanism. At its lower end, the magazine is provided with stop means 50 to hold the lowermost rod 45 positioned in the path of upward travel of the carrier hooks 49; the bottom end of the magazine being suitably cut away to permit the passing of the carrier hooks. The rods 45 descend through the magazine by gravity, and consequently as the carrier hooks 49 pass by the discharge end of the magazine, the rods are successively picked up by said hooks and carried upwardly to the upper end of the elevator mechanism and behind the material web 1 issued from the feed rollers 29—30.

Cooperative with the rod elevator mechanism is an oscillatable transfer means, the timed actuation of which operates to successively remove the rods from the elevator mechanism, to thereupon carry the same into engagement with the moving material web 1 issuing from the feed rollers 29—30, so as to drape said material web in successive looped folds dependent from the rods, and finally to deliver the rods with the looped folds dependent therefrom onto conveyer means upon which the thus looped material web is accumulated.

Said oscillatable transfer means comprises a pair of laterally spaced, upwardly extending lever arms 51, the lower ends of which are pivoted by a shaft 52 supported by and between bearings 53. Affixed to the upper end portions of said lever arms 51 are rearwardly extending yieldable gripper members 54, having inwardly offset shoulders 55 beyond which extend outwardly flared deflector portions 56. Extending forwardly from the under margins of said shoulder portions 55 of said gripper members are supporting tongues or rests 57. In the operation of said rod transfer means in cooperation with the rod elevator mechanism, as a rod 45, carried upward by the carrier hooks 49, reaches the upper limit of carrier hook rise, said rod is engaged by a yieldable spring detent arm 58 whereby the same is held against displacement from the hooks until engaged by the transfer means. The lever arms 51 of the transfer means, as operated, are timed to swing toward a racking rod 45 which has arrived at the top of the elevator mechanism, whereby the gripper members 54 are caused to spring over the ends of said rod. In this operation, the deflector portions 55 first engage the rod ends, and by the involved cam like action in contact therewith, said gripper members 54 are spread or flexed outwardly until the shoulders 55 pass and spring behind the said rod end portions, while supporting tongues or rests 57 engage under the latter so as to support the rod during ensuing forward swinging movement of the lever arms 51. Such forward swinging movement of the lever arms 51 carries forward the engaged racking rod 45 and moves the same beneath and into supporting engagement with the material web 1 which has issued from the feed rollers 29—30, thereby forming that portion of said material web which extends between this engaging rod and a previously advanced rod into a depending looped fold between said rods, whereupon continued forward swinging movement of the lever arms 51 carries the supported rod to and deposits the same upon an accumulating conveyer means to be subsequently described. These operations are repeated with respect to each successive racking rod delivered by the elevator mechanism, whereby the material web is accumulated on said accumulating conveyer means in the form of a series of successive, comparatively closely spaced dependent looped folds, as shown.

The means for transmitting operative power to the various mechanisms thus far described is subject to more or less wide variation in kind, form and arrangement. Illustrative however of one satisfactory form and arrangement thereof, as schematically shown in Fig. 3, is the following:

Suitably supported and driven is an overhead power shaft 60, which is preferably located in the neighborhood of the carroting mechanism. Journaled in and between the standards 42 of the elevator mechanism is a drive shaft 61, upon an end of which is fixed a drive pulley 62 which is driven by a belt 63 from a pulley 64 on said power shaft 60.

Journaled in and between the standards 42, below the drive shaft 61, is a countershaft 65. On this countershaft 65 are fixed toothed crank wheels 66, which are driven by gears 67 carried by said drive shaft 61. These crank wheels 66 produce properly timed oscillatory movements of the lever arms 51 of the rod transfer means, being connected thereto by connecting rods 68.

The upper sprockets 47, by which the elevator chains 46 are actuated, are fixed on a shaft 69 which is journaled in and between the upper portions of said standards 42. The lower sprockets 48 of the elevator chains are idlers, and are mounted on a shaft 70 which is journaled in and between the lower portions of said standards 42. Said shaft 69 is driven from the countershaft 65 by an intermediate chain and sprocket transmission 71.

The shaft 27 of the driven feed roller 29 is provided with a pulley 72 over which runs a crossed belt 73 actuated by a pulley 74 fixed on the drive shaft 61, whereby the feed rollers 29 and 30 are driven in proper direction for advancing the material web 1.

The shaft 6 of the knife cylinder 7 of the shearing mechanism is provided with a drive pulley 75 over which runs a belt 76 actuated by a pulley 77 fixed on the power shaft 60. In like manner, the shaft 14 of the brush member 13 of the shearing mechanism is provided with a drive pulley 78 over which runs a belt 79 actuated by a pulley 80 fixed on the power shaft 60.

The shaft 20 of the driven feed roller 22 is driven from the drive shaft 61 by an intermediate chain and sprocket transmission 81; and from said shaft 20, through an intermediate chain and sprocket transmission 82, is driven the shaft 37 of the presser roll 38.

The shaft 31 of the carroting acid applicator brush roll 32 is provided with a pulley 83 over which runs a belt 84 actuated by a pulley 85 fixed on the power shaft 60; and, similarly, the shaft 39 of the slicking brush of the carroting mechanism is provided with a pulley 86 over which runs a crossed belt 87 actuated by a pulley 88 fixed on the power shaft 60, whereby said slicking brush is rotated in a direction counter to the advancing movement of the material web 1 over the drum 18.

The accumulating conveyer is preferably located in a vestibule chamber A and leads to an enclosed seasoning chamber B provided with a conveyer means the receiving end of which cooperates with the discharge end of said accumulating conveyer; and said seasoning chamber conveyer leads to a drier chamber C also provided with a conveyer means the receiving end of which cooperates with the discharge end of said seasoning chamber conveyer. The chambers A, B and C are separated by partitioning walls 90, and are provided with overhead roofing 91.

The accumulating conveyer is suspended from said overhead roofing 91, and comprises parallel laterally spaced endless conveyer chains 92 which are independently but synchronously driven. Each such conveyer chain system comprises a rearward bearing bracket means 93 and a forward bearing bracket means 94. Journaled in said bearing bracket means 94 is a shaft 95 on which is fixed the drive sprocket 96 for the conveyer chain 92; the latter being supported at its receiving end by an idler sprocket 97 which is rotatably supported on an arm 98 affixed to the rearward bearing bracket means 93. Each conveyer chain 92 is power driven in operative direction by a transmission chain 99 which engages a sprocket 100 fixed on the shaft 95. This transmission chain 99 is actuated by a drive sprocket 101 loosely mounted on the shaft 27 of the driven feed roller 29. Fixed on said shaft 27 is a driver ratchet wheel 102 which operatively engages a cooperating pawl 103 carried by said drive sprocket 101. The forward running racking rod carrying course of the conveyer chain 92 is supported against sagging by a fixed underlying track bar T extending between the bracket means 93 and 94.

The seasoning chamber conveyer is also suspended from the overhead roofing 91, and comprises parallel laterally spaced endless conveyer chains 104 which are also independently but synchronously operated. Each such conveyer chain sysstem is mounted between a bearing bracket means 105 and the aforesaid bearing bracket means 94, the former being located at the discharge end of the seasoning chamber B and the latter at the receiving end of said seasoning chamber. Journaled in said bearing bracket means 105 is a shaft 106 on which is fixed the drive sprocket 107 for the conveyer chain 104; the latter being supported at its receiving end by a sprocket 108 loose on the shaft 95. The forwardly running courses of the conveyer chains 104 are also supported by track bars T against sagging.

The drier chamber conveyer is likewise suspended from the overhead roofing 91, and comprises parallel laterally spaced endless conveyer chains 109 which are independently but synchronously operated. Each such conveyer chain system is mounted between a bearing bracket means 110 and the previously described bearing means 105, the former being located adjacent to the discharge end of the drier chamber C. Journaled in said bearing bracket means 110 is a shaft 111 on which is fixed the drive sprocket 112 for the conveyer chain 109; the latter, at its receiving end running over an idler sprocket 113 loose on the shaft 106. The forwardly running courses of the conveyer chains 109 are also supported by track bars T against sagging. Said shaft 111 extends transversely between the bearing bracket means 110 of the respective drier chain systems, being thus common to both, and mounted on this shaft 111 between the discharge ends of said drier chain systems is a discharge roller 114 over which the material web 1 together with the racking rods 45 move, whereby the discharged material web 1 may issue through a discharge opening 115 provided in the end wall 116 of the drier chamber C, and whereby the rack rods 45, after passing over the discharge roller 114 are caused to drop into a collection bin 117, from which they may thereafter be removed and restored for re-use in the rod magazine 44.

Spaced outwardly from the end wall 116 of the drier chamber C, and in alignment with the discharge opening 115 thereof, is a pair of driven feed rollers 118 and 119, the respective shafts 120 and 121 of which are journaled in and between bearing hangers 122. Located adjacently below said feed rollers 118—119 is a fur cutting machine 123 of any well-known construction to which the material web 1 is led, through suitable guide means 124, and to the action of which the carroted fur is submitted, so as to be cut away from the skins, pelts or hides carried by said carrier sheet portion of said web 1; said carrier sheet being thereupon led to a driven reeling means so as to be wound into a roll 125. The severed fur is carried by the discharge apron 126 of the cutting machine to a separating or blowing machine 127 of well-known kind, wherein pieces of skin and other impurities are removed, whereupon the cleaned fur is discharged therefrom by discharge rollers 128 in the form of a bat or sheet, which may be suitably bundled for subsequent delivery for use in hat manufacturing operations.

The main shaft 129 of the cutting machine 123 is provided with a drive pulley 130 driven by a belt 131 from a suitable power source, or said main shaft 129 may be driven in any other suitable manner. The shaft 132 of the web carrier sheet reeling means, which is removably journaled in and between pedestal bearings 133 is provided with a drive pulley 134 which is driven by a belt 135 by a driving pulley 136 on the cutting machine main shaft. Said reeling means may be otherwise driven in any other suitable manner.

The feed rollers 118—119 and the drier and seasoning chamber conveyer systems may be driven from any source of power in a variety of ways. Illustrative of one convenient method of driving these elements is the following transmission arrangement, which is adapted to be operated from the main shaft 129 of the cutting machine; said arrangement being schematically shown in Fig. 3. In said arrangement is included a variable speed control means 137 of suitable character, the power input side of which is driven by a chain and sprocket transmission means 138 from said cutting machine main shaft 129. The power output side of said variable speed control means drives the shaft 120 of the feed rollers 118—119 through an intermediate chain and sprocket drive 139. A second variable speed control means 140 is further provided, the power input side of which is driven by a chain and sprocket transmission means 141 from the opposite end of said feed roller shaft 120. The power output side of said variable speed control means 140 drives the shaft 111 of the drier conveyer chain system through an intermediate chain and sprocket drive 141'. The seasoning chamber conveyer chains 104 are each power driven from shaft 111, and to this end sprockets 142 are fixed on said shaft 111, which sprockets operate transmission chains 143 which run over sprockets 144 loosely mounted on said shafts 106. Fixed on said shafts 106 are driven ratchet wheels 145 which are operatively engaged by pawls 146 carried by said sprockets 144, whereby driving power of the latter is transmitted to shafts 106, and, through the drive sprockets 107 thereon, to the seasoning chamber conveyer chains 104. The described transmission is so arranged that, when the seasoning chamber conveyer system and the drier chamber conveyer system are operated together by power, the latter will move at a somewhat higher rate of speed than the former, whereby the racking rods 45 which carry dependent looped folds of the material web 1, will be caused to separate one from the other as they move from one conveyer to the other, so that, when deposited on the drier chamber conveyer, the looped folds will be somewhat opened out for more efficient drying effect.

Means is provided whereby, at desired times, the seasoning chamber conveyer and the accumulating conveyer may be operated together manually and independently of power operation thereof, such manual operation being resorted to when transferring racking rods 45, with their dependent looped folds of the material web 1, from the accumulating conveyer to the seasoning chamber conveyer. To accomplish this end clutch means 147 are slidably mounted on the shafts 95, the same having clutch pins 148 adapted to be removably engaged through aligned clutch pin receiving openings 149 and 150 respectively provided in the fast drive sprockets 96 of the accumulating conveyer chains 92 and in the loose or idler sprockets 108 which are mounted on the shafts 95. When the clutch means are moved to operative positions, said loose or idler sprockets 108 will be locked to the fast drive sprockets 96, and consequently, when the seasoning chamber conveyer chains are operated by hand by means of the hand wheels 151 affixed to the drive shafts 106 thereof, accompanying operative movement will be transmitted to the accumulating conveyer chains 92 through the described clutch means.

Within the lower part of the seasoning chamber B are arranged heating coils 152 which radiate a moderate heat whereby the material web 1 stored therein is preheated during seasoning and preliminary to final drying in the drier chamber C.

Within the upper part of the drier chamber C is arranged means 153 for introducing hot air into the interior thereof for circulation about the opened out dependent looped material web 1, whereby drying of the fur is completed. The hot air thus introduced is kept in movement by outward passage through a discharge vent 154 at the bottom of the drier chamber, through which it may be moved by suction means, such as an exhaust fan (not shown), and returned, if desired, to the hot air supplying unit (not shown). Means may also be provided for tempering the hot air with cold fresh air, which may be introduced through an intake port 155, preferably located in the lower part of the drier chamber. Damp air may be vented from the drier chamber through a suitably located outlet 156 provided in a wall of the chamber for that purpose.

In carrying out the operations for producing hat fur, from the supply roll 2 the material web 1 is led over and around the guide means 10 of the shearing mechanism so as to be submitted to the action of the rotary brush member 13 which operates to loosen up the fur preliminary to shearing away the excess hair of the fur pieces carried by the web. The thus loosened fur is thereupon subjected to the action of the cooperating shearing blades 8 and bed-knife 9, as the material web 1 is drawn by the feed rollers 22—23 around the supporting roller 11, whereby excess and long hair is cut away from the fur pieces so as to expose the soft underlying fur which is suitable for hat manufacture.

The material web 1 advanced from the shearing mechanism passes beneath and upwardly around the drum 18 of the carroting mechanism, so as to be supported or backed by said drum subject to the application of carroting acid thereto. The rotated acid applicator brush roll 32 picks up carroting acid from the reservoir tray 33 and brushes said acid into the fur, whereafter, if employed, the presser roll 38 functions to press or squeeze the fur so as to thoroughly distribute the applied acid throughout the fur mass and so as to uniformly contact the fur filaments. Before passing away from the support of the drum 18, the material web 1 is engaged by the rotating slicking brush 40, which operates to slick down the acid wet fur, while at the same time brushing out any excess acid. From the drum 18, the material web 1 passes upwardly over the guideway 24 to the feed rollers 29—30, which not only serve to draw the material web through the carroting mechanism, but also to advance said web subject to application to racking rods upon which the same is supported in dependent looped folds for further processing.

The racking of the material web 1 is automatically accomplished by the timed cooperation of the racking rod elevator mechanism and the oscillating rod transfer means, whereby rods 45 delivered by the elevator mechanism are successively picked up by the transfer means and swung forwardly against the material web 1, issuing from the feed rollers 29—30, so that said web is draped over the rods to hang between adjacent rods in dependent looped folds. The rods 45 with the looped folds of the material web 1 dependent therefrom are successively deposited upon the accumulating conveyer chains 92, by which the same are advanced into the vestibule chamber A so as to accumulate a desired length of the web material 1; which, for example, may approximate five thousand feet constituting a day's output of the cutting mechanism.

During the operation of the accumulating conveyer, the clutch devices 147 are released so that said accumulating conveyer runs independently of the seasoning chamber and drier chamber conveyers. If the latter conveyers are empty, they are allowed to stand idle, but if they are charged with a preceding run of the web material they may be operated independently of the accumulating conveyer so as to move the material web out of the seasoning chamber B, through the drier chamber C and thence to the fur cutting and blowing mechanisms, while the accumulating conveyer is being operated to accumulate a fresh batch of carroted material web.

At the end of the day's run of the carroting mechanism, the accumulating conveyer having been filled by the output thereof, the carroting mechanism and associated racking rod supplying and transfer mechanisms are stopped, and the clutch devices 147 between the accumulating conveyer and the seasoning chamber conveyer are moved to couple these conveyers for simultaneous manual operation, so that by turning the hand wheels 151 these conveyers are jointly actuated, whereby the accumulated material web 1 is transferred from the accumulating conveyer onto the seasoning chamber conveyer, and the accumulated material web thus moved into the seasoning chamber B; whereupon the clutch devices 147 are again released. Since the power drive of the accumulating conveyer is transmitted through the ratchet and pawl connection 102—103, and the power drive of the seasoning chamber conveyer is transmitted through the ratchet and pawl connection 145—146, movement of the accumulating and seasoning chamber conveyers, when manually operated is not obstructed by the respective power driving transmissions thereof, since the ratchet and pawl connections afford a slip coupling relation between said conveyers and their power driving transmission.

The run of carroted material web 1 having been transferred to and deposited within the seasoning chamber B, the same is allowed to remain therein over night for what may be termed a seasoning period, so that the carroting acid, which has been applied to the fur, is given ample time to effect its action upon the fur filaments whereby the desired felting characteristics of the fur are produced.

After the carroted fur has thus been seasoned overnight, the mechanisms are next day again operated under power actuated conditions, whereby a new accumulation of carroted material web 1 is gathered by the accumulating conveyer. While the accumulating conveyer operates to gather this new accumulation of carroted material web 1, the previous accumulation thereof, which has been seasoned in the seasoning chamber B is, by the joint operation of the seasoning chamber conveyer and the drier chamber conveyer, slowly moved from the seasoning chamber B and into and through the drier chamber C. Owing to the fact that the drier chamber conveyer chains 109 are operated at a somewhat higher speed than are the seasoning chamber conveyer chains 104, as the material web 1 is moved from the one to the other, the racking rods 45 are caused to be somewhat more widely separated, whereby the looped folds of the web dependent therefrom are spread more widely open. By thus opening up the looped folds of the web, while the same are slowly passed through the drier chamber C, the application to the thus exposed fur of the heated air, circulated through the drier chamber C, is facilitated, whereby a rapid and thorough drying of the carroted fur preliminary to cutting and blowing thereof is assured.

At the discharge end of the drier chamber conveyer, the dried material web 1 is led, with the underlying racking rods 45, over the discharge roller 114, so that the web passes out of the drier chamber through the discharge opening 115, being drawn outwardly therethrough by the feed rollers 118—119. As the racking rods 45 pass over and beyond the discharge roller, the same being no longer supported, fall away from the outgoing course of the web 1, and drop into the collecting bin 117, from whence they may be subsequently removed and returned by hand to the rod magazine 44, subject to delivery therefrom for repeated use.

The dried material web 1 is fed by the feed rollers 118—119 downwardly to and through the guide means 124, by which the same is led to the cutting machine 123, subject to the action thereof. At the cutting machine the carroted fur is cut away from the skins, fur pieces or pelts (as the case may be) which are carried by the web, and the fur thus freed is thence carried to the blowing or separating mechanism 127, by the action of which any small piece of skin or other foreign matter or like impurities are removed therefrom, whereupon the clean carroted fur ready for use in hat making operations is discharged.

The web 1a, from which the fur has been severed, is led from the cutting mechanism and reeled up into roll 125 for subsequent disposal.

From the above description it will be obvious that a very efficient means of producing hat fur is afforded, whereby the various operations of preliminary shearing, carroting, seasoning, drying, cutting and blowing may be carried on with a minimum of labor and with great saving of time, since all direct manual handling of the fur during the performance of the respective operations, as well as in transferring the same from one operation to another is entirely eliminated. Not only is this so, but also the method pursued according to this invention operates to assure a more uniform hat fur product. It will be understood that the invention comprehends not only the performance in sequence of the several operations above described, but also any desired lesser number thereof, in the event any particular operation or operations is or are desired to be omitted in any given case.

It will be understood that the apparatus may be operated as a whole continuously, i. e. without necessity for allowing a period of dwell in the seasoning chamber, in all cases where the carroting acid is of a kind that is quickly effective on contact with the fur; it will therefore be obvious that the seasoning chamber may be omitted in some cases, or if retained merely utilized as a transfer service to the drying chamber per se. Furthermore, the drying chamber may be varied in length and capacity as may be desirable in any given case.

It will also be obvious that the means for looping an indeterminate length of flexible material upon racking rods and then accumulating the formed dependent loops upon conveyer means for movement thereof through either seasoning or drying chambers or both, or subject to other specific treatment, is adapted for handling many kinds of flexible sheet or like materials other than the specific fur bearing web hereinabove described, and consequently such features of this invention, being of general application, are hereinafter broadly as well as specifically claimed.

I am aware that changes could be made in the method procedure, as well as in the apparatus described and shown, without departing from the scope of this invention as defined in the following claims. It is therefore intended that all matter contained in the above description or shown in the accompanying drawings shall be interpreted as illustrative and not in a limiting sense.

I claim:

1. Apparatus for forming an indeterminate running length of flexible material into rod supported dependent looped folds and depositing the same onto conveyer means comprising, means for advancing the material toward the conveyer means, a pivoted oscillatable transfer means swingable between said material advancing means and the conveyer means, said transfer means having members to releaseably grip and support opposite ends of a rod so as to carry the rod beneath and into supporting engagement with a material portion issuing from the material advancing means, whereby to drape said material portion over the rod and thereupon deliver the rod onto the conveyer means, and synchronously operated means for successively carrying and delivering rods in spaced relation from a supply thereof to a position subject to engagement by the rod gripping and supporting members of said transfer means.

2. Apparatus for forming an indeterminate running length of flexible material into rod supported dependent looped folds subject to be conveyed through drying or other treating means comprising a driven conveyer means, means for advancing the material toward the receiving end of said conveyer means, a pivoted oscillatable transfer means swingable between said material advancing means and the receiving end of said conveyer means, said transfer means having members to releaseably grip and support opposite ends of a rod so as to carry the rod beneath and into supporting engagement with a material portion issuing from the material advancing means, whereby to drape said material portion over the rod and thereupon deliver the rod onto the conveyer means, and means for successively carrying and delivering rods in spaced apart relation to said transfer means.

3. Apparatus for forming an indeterminate running length of flexible material into rod supported dependent looped folds subject to be conveyed through drying or other treating means comprising a driven conveyer means, means for advancing the material toward the receiving end of said conveyer means, an oscillatable transfer means movable between said material advancing means and the receiving end of said conveyer means, said transfer means having members to releaseably grip and support opposite ends of a rod so as to carry the rod beneath and into supporting engagement with a material portion issuing from the material advancing means, whereby to drape said material portion over the rod and thereupon deliver the rod onto the conveyer means, a rod magazine, and a rod elevator means supplied with rods from said magazine, said elevator means being adapted to successively carry rods into position to be engaged by said transfer means.

4. Apparatus for forming an indeterminate running length of flexible material into rod supported dependent looped folds subject to be conveyed through drying or other treating means comprising a driven conveyer means, means for advancing the material toward the receiving end of said conveyer means, an oscillatable transfer means movable between said material advancing means and the receiving end of said conveyer means, said transfer means having members to releaseably grip and support opposite ends of a rod so as to carry the rod beneath and into supporting engagement with a material portion issuing from the material advancing means, whereby to drape said material portion over the rod and thereupon deliver the rod onto the conveyer means, driven crank wheel means, connecting rod means interconnecting said crank wheel means and said transfer means whereby to produce timed oscillation of the latter, and means for successively delivering rods to said transfer means.

5. Apparatus for forming an indeterminate running length of flexible material into rod supported dependent looped folds subject to be conveyed through drying or other treating means comprising a driven conveyer means, means for advancing the material toward the receiving end of said conveyer means, an oscillatable transfer means movable between said material advancing means and the receiving end of said conveyer means, said transfer means having members to releaseably grip and support opposite ends of a rod so as to carry the rod beneath and into supporting engagement with a material portion issuing from the material advancing means, whereby to drape said material portion over the rod and thereupon deliver the rod onto the conveyer means, driven crank wheel means, connecting rod means interconnecting said crank wheel means and said transfer means whereby to produce timed oscillation of the latter, a rod magazine, and a rod elevator means supplied with rods from said magazine, said elevator means being adapted to successively carry rods into position to be engaged by said transfer means.

6. Appratus for forming an indeterminate running length of flexible material into rod supported dependent looped folds subject to be conveyed through drying or other treating means comprising a driven conveyer means, means for advancing the material toward the receiving end of said conveyer means, an oscillatable transfer means movable between said material advancing means and the receiving end of said conveyer means, said transfer means having members to releaseably grip and support opposite ends of a rod so as to carry the rod beneath and into supporting engagement with a material portion issuing from the material advancing means, whereby to drape said material portion over the rod and thereupon deliver the rod onto the conveyer means, driven crank wheel means, connecting rod means interconnecting said crank wheel means and said transfer means whereby to produce timed oscillation of the latter, a driven endless elevator belt means having spaced rod carrier hooks, a rod magazine adapted to supply rods subject to successive engagement by the hooks on the rising course of said elevator belt means, whereby to carry rods into position to be engaged by said transfer means.

7. In apparatus for forming an indeterminate running length of flexible carrier web upon which carroted fur bearing skins or portions thereof are adhered into rod supported dependent looped folds, driven conveyer means to receive and advance the rod supported web folds through fur drying and treating chambers, means for advancing the web toward the receiving end of said conveyer means, an oscillatable transfer means movable between said web advancing means and the receiving end of said conveyer means, said transfer means having members to releaseably grip and support opposite ends of a rod so as to carry the rod beneath and into supporting engagement with a web portion issuing from said web advancing means, whereby to drape said web over the rod and thereupon deliver the rod onto the conveyer means, means for successively delivering rods to said transfer means, means for separating the rods from the web at the discharge end of said conveyer means, and means for withdrawing the web from the discharge end of said conveyer means.

8. In apparatus as defined in claim 7, wherein the means for successively delivering rods to the transfer means comprises a driven endless elevator belt means having spaced rod carrier hooks, and a rod magazine adapted to supply rods subject to successive engagement by the hooks on the rising course of said elevator belt means.

ROBERT H. PLASS.